United States Patent [19]

McGregor

[11] Patent Number: 4,863,367
[45] Date of Patent: Sep. 5, 1989

[54] CONTINUOUS REINFORCEMENT METHOD FOR FLEXIBLE BEARING LAMINATE

[75] Inventor: James D. McGregor, Logan, Utah

[73] Assignee: Morton Thiokol, Inc., Chicago, Ill.

[21] Appl. No.: 183,568

[22] Filed: Apr. 14, 1988

[51] Int. Cl.⁴ .............................................. B29C 43/02
[52] U.S. Cl. .................................... 425/438; 156/425; 249/175
[58] Field of Search ............... 249/175, 176; 242/7.21, 242/7.22; 156/425, 429, 433, 443, 446; 29/122, 128; 411/426; 425/412, 436, 438

[56] References Cited

U.S. PATENT DOCUMENTS

| | | | |
|---|---|---|---|
| 1,202,518 | 10/1916 | Henwood | 248/207 |
| 1,665,988 | 4/1928 | Smith | 411/426 |
| 3,193,858 | 7/1965 | Kahn | 29/523 |
| 4,708,758 | 11/1987 | McGregor | 156/245 |

FOREIGN PATENT DOCUMENTS

| | | | |
|---|---|---|---|
| 3006101 | 8/1981 | Fed. Rep. of Germany | 29/456 |
| 2477045 | 9/1981 | France | 140/92.1 |
| 316627 | 8/1929 | United Kingdom | 411/426 |
| 2076714 | 12/1981 | United Kingdom | 140/92.1 |

*Primary Examiner*—Willard Hoag
*Attorney, Agent, or Firm*—Gerald K. White

[57] ABSTRACT

A method for simplifying the fabrication of flexible bearings and reducing the production costs thereof includes preparing reinforcement material for the laminate in the form of a continuous helical arrangement, placing a first end ring in the bottom of a mold with a laminate engaging surface facing upwards, placing the continuous helical arrangement of reinforcement material on the laminate engaging surface of the first end ring, with layers of elastomeric material alternating with layers of reinforcement material, to form a laminate, placing a second end ring in the mold with a laminate engaging surface thereof in engagement with the laminate, coaxially therewith and with the first end ring, and debulking and curing the assembly.

5 Claims, 5 Drawing Sheets

CONTINUOUS REINFORCEMENT METHOD FOR FLEXIBLE BEARING LAMINATE

BACKGROUND OF THE INVENTION

1. Field of the Invention

The present invention relates to flexible bearings, and more particularly, to an improved method for the fabrication thereof.

2. Description of the prior Art

In the fabrication of flexible bearings in the prior art, it is known to utilize a lamination comprised of alternate layers of an elastomeric material and rigid reinforcement shims that are stacked and bonded together. With elastomer as both the top and bottom layers, the lamination is positioned between and bonded to metallic end rings. One end ring may comprise the thrust-nozzle ring of a rocket motor and the other the rocket case mounting ring. The lamination is characterized in that it is flexible in directions parallel to the layers, but is relatively unyielding in directions perpendicular thereto.

This type of flexible bearing has many uses in addition to mounting a movable thrust nozzle to a rocket motor case, including applications to motor mounts and bridge abutments. In its application to mounting a movable thrust nozzle to a rocket motor case, the flexible bearing is annular in form. Additionally, the layers of elastomer and the rigid reinforcement shims are shaped to conform to the surfaces of concentric spheres thereby to enable the thrust nozzle to be rotated about a fixed point. This is desirable for precision control of the rocket.

A typical bearing of this type having practical application for mounting a movable thrust nozzle to a rocket motor case is disclosed in U.S. Pat. No. 3,941,433 that was issued on Mar. 2, 1976 to William T. Dolling et al. and is assigned to the assignee of the present invention.

High temperature steel is stated in, U.S. Pat. No. 3,941,433 to be a preferred material for the rigid reinforcement shims. Reinforcement shims made of materials other than steel are also known. Thus, reinforcement shims have been fabricated from non-metallic materials such, for example, as glass cloth or other suitable fabric material. Such reinforcement shims contain, in addition to cloth, a resin or hardening material.

In the fabrication of reinforcement shims from non-metallic materials for mounting a movable thrust nozzle to a rocket motor case, it has been the practice in the prior art to separately prefabricate, in cured form, each of the plurality of rigid reinforcement shims that are employed in the flexible bearing lamination. An individually associated mold has been required for each of the reinforcement shims because each reinforcement shim conforms to the surface of an individually associated sphere having its own, unique radius. Thus, for example, in a lamination having nine reinforcement shims in the stack, nine separate and different molds are required for the prefabrication of the shims.

This prior art practice involving a multiplicity of molds for the laminate of each flexible bearing being fabricated significantly adds to the cost of the necessary tooling in addition to being labor intensive. Such tooling and labor costs escalate and become particularly onerous where fabrication of flexible bearings of several different sizes is involved. This is because of the numerous molds that are required to be used and the necessity for guarding against mixup of the many prefabricated reinforcement shims being produced. Additionally, the rejection rate of laminations made from prefabricated rigid reinforcement shims has been undesirably high. As a result, a very thorough inspection of each prefabricated reinforcement shim for the flexible bearing has been necessary to determine if it is in conformance with the required standards for the specific use for which it has been fabricated. This has significantly added further to the cost of production.

A method improving upon such prior art practice in the fabrication of flexible bearings and which enables a substantial reduction in the cost of tooling and labor and eliminates also the need for inspection of prefabricated reinforcement shims is disclosed in my U.S. Pat. No. 4,708,758 and is assigned to the assignee of the present invention.

The method there involved for making a flexible bearing, wherein the surface of each of first and second end rings adjacent the laminate and the surfaces of the layers of elastomer and rigid reinforcement shims of the lamination conform to surfaces of concentric spheres, comprises steps of:

(1) fitting together the end rings and laminate materials into an assembly of desired geometry with the resin impregnated fabric material being uncured, where prior to fitting together the end rings and laminate into an assembly, each of the layers of resin impregnated fabric material is formed into a reinforcement preform by pressing and compacting, wherein the reinforcement preforms are formed one at a time in a first mold configured to make the surfaces of the preforms conform to the surfaces of concentric spheres, and wherein the first mold is placed in a press for effecting pressing and compacting each preform; and (2) subjecting the assembly to heat and pressure thereby to cause cure and vulcanization of the elastomeric material and reinforcement shims.

In one embodiment disclosed in U.S. Pat. No. 4,708,758, six "quarter circle" plies of resin impregnated glass cloth, constituting a total of twenty-four patterns, are used for each reinforcement shim layer. The elastomer for the lamination comprises calendered natural or synthetic rubber pads having good elastic and holding properties over a wide temperature range.

While the method disclosed in my aforementioned patent has effected a substantial improvement in the cost of fabricating flexible bearings, there is, however, a need and a demand for effecting further improvement. Specifically, there is a need for effecting improvement in the method of fabricating flexible bearings in order to eliminate the need of mold tooling to form individual reinforcement shims, and in addition, the labor involved in producing individual reinforcement shim preforms thereby further to simplify and reduce production costs. The present invention was devised to fill the technological gap that has existed in the art in these respects.

SUMMARY OF THE INVENTION

An object of the invention is to provide a method for simplifying the fabrication of flexible bearings and reducing the production costs thereof.

Another object of the invention is to make a flexible bearing that is fabricated of first and second rigid end rings having opposing laminate engaging surfaces with a flexible laminate therebetween consisting of alternate layers of elastomeric material and reinforcement material, comprising the steps of:

(a) preparing the reinforcement material in the form of a continuous helical arrangement;

(b) placing the first end ring in the bottom of a mold with the laminate engaging surface thereof facing upwards;

(c) coiling the continuous helical arrangement of reinforcement material on the laminate engaging surface of the first end ring, coaxially therewith, with layers of elastomeric material alternating with layers of reinforcement material, to form the laminate;

(d) placing the second end ring in the mold with the laminate engaging surface thereof in engagement with the laminate, coaxially therewith, and with the first end ring; and (e) debulking and curing the assembly.

Another object of the invention is to provide a stacking tool to facilitate coiling of the laminate on the first end ring.

In a preferred embodiment of the invention, material for the reinforcement layers of the lamination for the flexible bearing is prepared by cutting from pre-impregnated glass cloth broadgoods the amount of patterns necessary for the number of layers desired. Generally, each pattern is an even fraction, for example, one-fourth (¼), of the circumference of one reinforcement layer. Upon the assumption that two plies are needed to make a reinforcement layer of the desired thickness, eight such patterns are required for each of the reinforcement layers. Where nine reinforcement layers are employed in the laminate, as in one embodiment of the invention, 72 such patterns are required. The ply thickness requirement is met by sewing two plies of like patterns together. For thicker patterns additional plies of like patterns are sewn together.

After the thickness requirement has been met, the ends of the patterns are joined together to form a continuous helical reinforcement arrangement. This arrangement is painted on both sides with two coats of adhesive.

Methods other than that described above for the preferred embodiment of the invention may be employed for preparing the continuous helix of reinforcement material.

For example, continuous braiding or weaving, followed by impregnation of the braided or woven reinforcement, may be employed to eliminate cutting and sewing. The helix could also be prepared by knitting.

Elastomer is prepared by cutting patterns from calendered stock of desired thickness. The patterns of elastomer, similar to the patterns of reinforcement, are one-fourth (¼) of the circumference of one elastomer layer. The number of elastomer patterns required is based on four patters per layer times ten layers, or 40 patterns of elastomer.

Further, in accordance with the invention, assembling and molding comprises placing the forward end ring in the bottom of a mold and then coiling the continuous reinforcement with alternating layers of elastomer to form the laminate. The aft end ring is then placed in position and the assembly is debulked and cured.

For facilitating the formation of the reinforcement material and elastomer into a helical coil, there is provided a tool which, for convenience, is referred to hereinafter as a stacking tool. The stacking tool comprises a conical member that is circumscribed by a continuous helical ridge upon which the impregnated reinforcement material and elastomer may be wound. Also provided in association with the stacking tool is a laminate removal tool for lifting the pre-impregnated reinforcement material and elastomer from the core in the proper configuration for debulking.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification and in which like parts are designated by the same reference numbers, of which drawings.

DESCRIPTION OF THE PREFERRED EMBODIMENT

Figure 1:
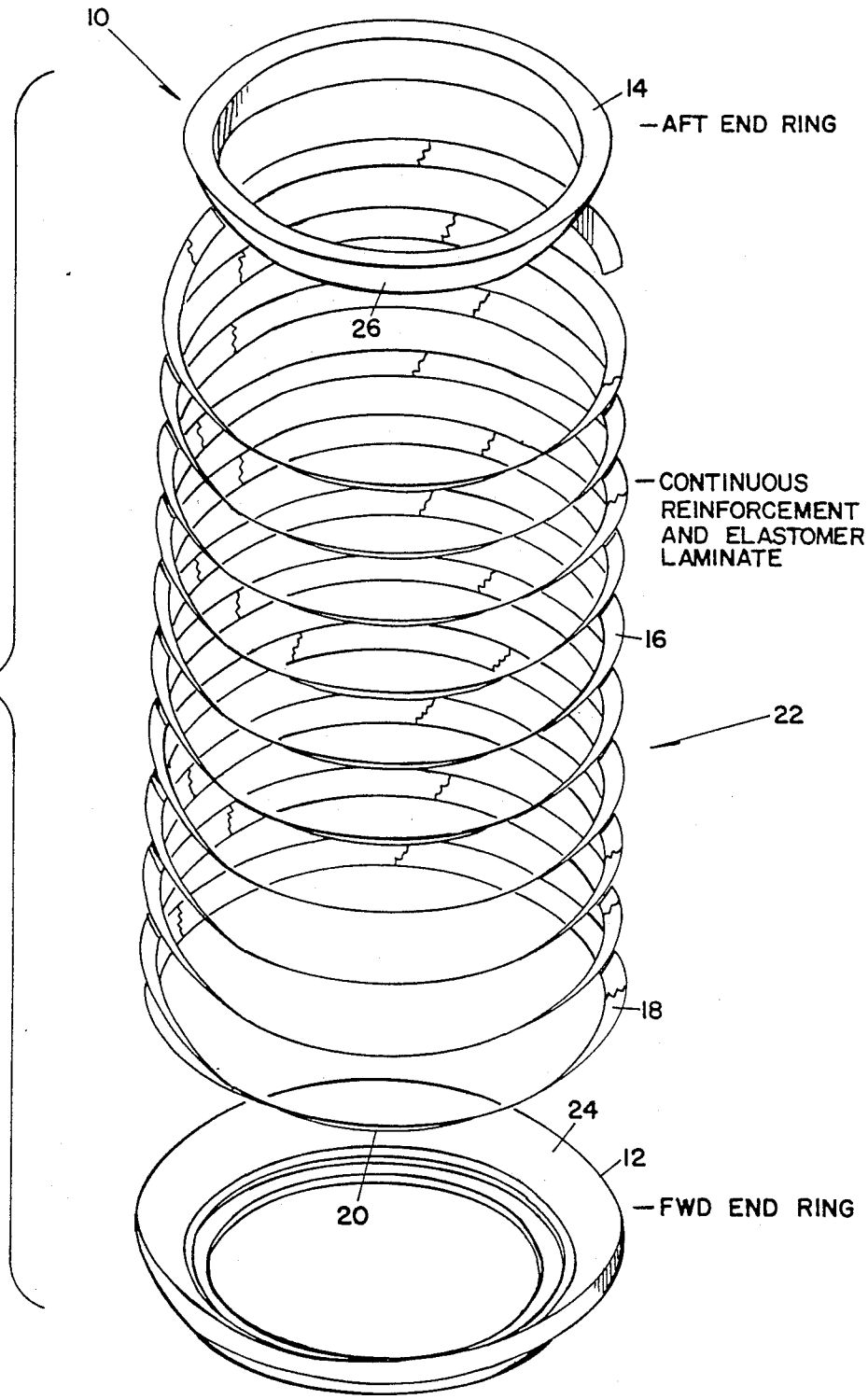
FIG. 1 is an exploded perspective view of a flexible bearing made in accordance with the method of the present invention.
Figure 2:
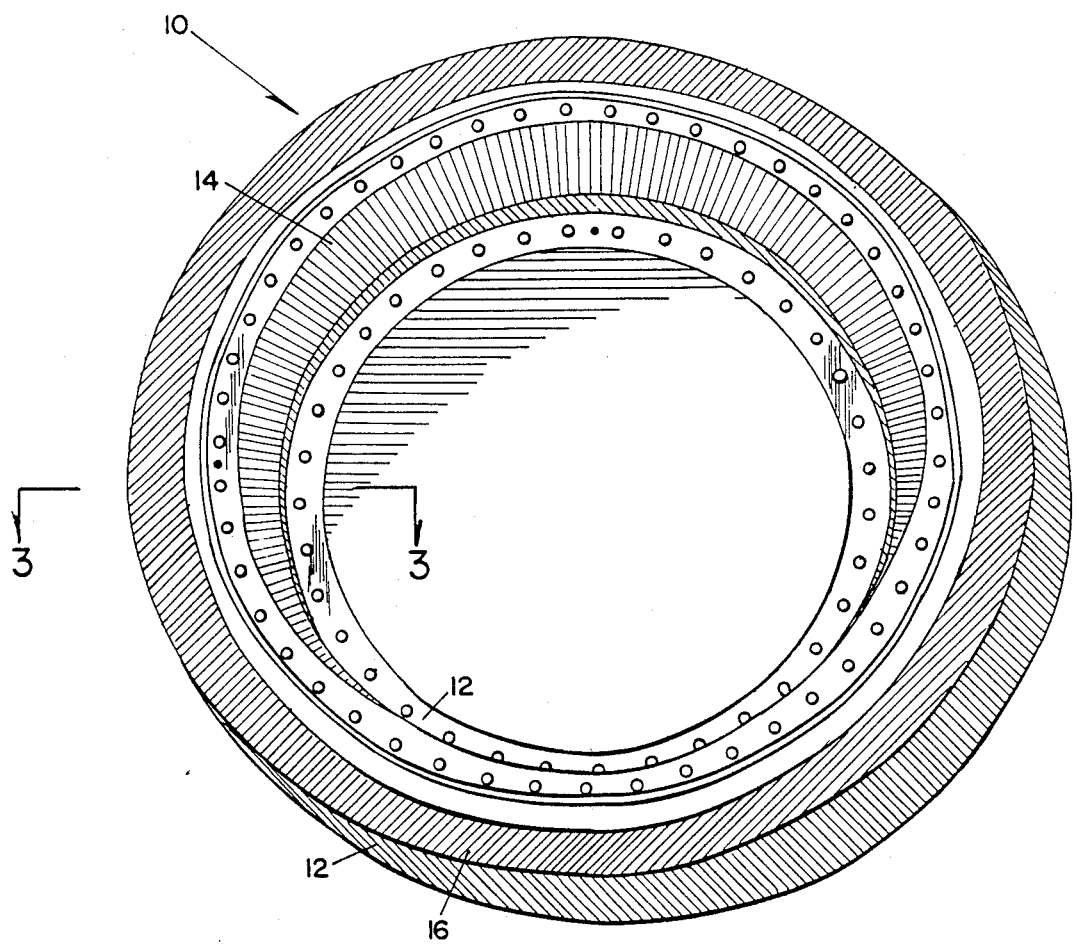
FIG. 2 is a perspective view of the assembled bearing according to the invention.
Figure 3:
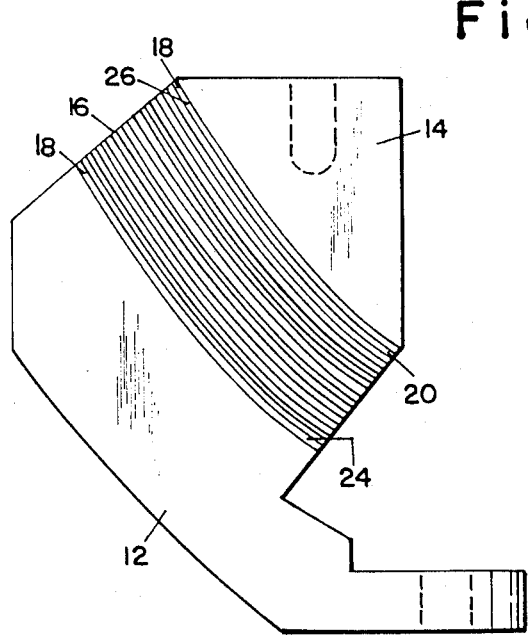
FIG. 3 is a cross section of the flexible bearing taken along the line 3—3 of FIG. 2.

FIGS. 1 through 4 of the drawings illustrate a flexible bearing 10 that is made in accordance with the method of the present invention. Bearing 10 includes rigid end rings 12 and 14. For convenience, the end ring 12 is termed a first end ring and the end ring 14 is termed a second end ring. When used for attaching a thrust nozzle to a rocket case, the bearing 10 is annular in form with the first end ring 12 comprising the forward end ring and the second end ring 14 comprising the aft end ring.

Positioned between the first end ring 12 and the second end ring 14 and bonded thereto is a laminate 16. Laminate 16 comprises alternating reinforcement layers 18 and elastomer layers 20 that are wound in a helical arrangement, indicated at 22, between the facing laminate engaging surfaces 24 and 26, respectively, of the first end ring 12 and the second end ring 14.

The end rings 12 and 14 are made of a suitable material such as steel with the surfaces of each of the end rings adjacent the lamination layers of elastomer and reinforcement conforming to surfaces of concentric spheres.

Each of the reinforcement layers 18 may comprise pre-impregnated glass cloth 0.050 inches (0.127 cm.) thick with each of the elastomer layers 20 being 0.040 inches (0.102 cm.) thick. The elastomer used for layers 20 may comprise calendered natural or synthetic rubber pads having good elastic and holding properties over a wide temperature range. A synthetic rubber formulation of polyisoprene may be employed for applications involving ambient temperatures down to 0° F. ($-17.77°$ C.). A silicone rubber formulation may be employed for applications involving ambient temperatures down to $-65°$ F. ($-53.9°$ C.).

The fabrication sequence of a flexible bearing, according to a preferred embodiment of the invention, as follows:

1. The machined end rings 12 and 14 are prepared by grit blasting, solvent wipe, and application of suitable adhesives.

Figure 4:
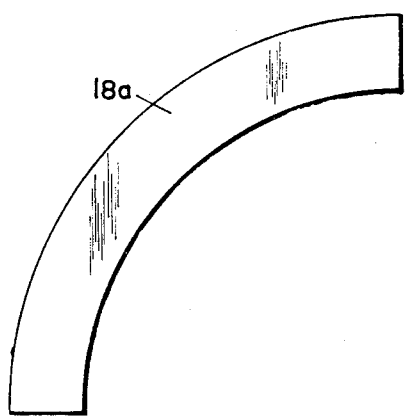
FIG. 4 is a plan view of a "quarter circle" ply of resin impregnated glass cloth used in the fabrication of the reinforcement layers.

2. Material for the reinforcement layers 18 is prepared by cutting from pre-impregnated glass cloth E760D/S-915 broadgoods the amount of patterns necessary to make nine reinforcement layers. Such broadgoods are commercially available from U.S. Polymeric, Santa Ana, Calif. and contain a resin content in the range of 25–30% by weight. Depending on the thickness and the debulk factor, the thickness of each reinforcement layer 18 could be as few as one or two plies of the pre-impregnated glass cloth material. If two plies are needed to make a 0.050 inch thick reinforcement layer, the plies are sewn together, one on top of the other. Generally, as shown in FIG. 4, each pattern 18a is one-fourth (¼) of the circumference of one reinforcement layer. Thus, eight such patterns are required for each of the nine reinforcement layers for a total of seventy-two (72) patterns required for the laminate. After the ply thickness requirement has been met by sewing two plies of like patterns together, the patterns are sewn together, end-to-end, in such a manner as to form a continuous helical arrangement of reinforcement layers, as illustrated in FIG. 1. These layers of pre-impregnated glass cloth are then painted with two coats of adhesive.

3. The elastomer layers 20 are prepared by cutting patterns from calendered stock of desired thickness with each pattern comprising one-fourth (¼) of the circumference of one elastomer layer. The amount of elastomer patterns required is based on four patterns per layer times ten layers, or forty (40) patterns of elastomer.

Figure 5:
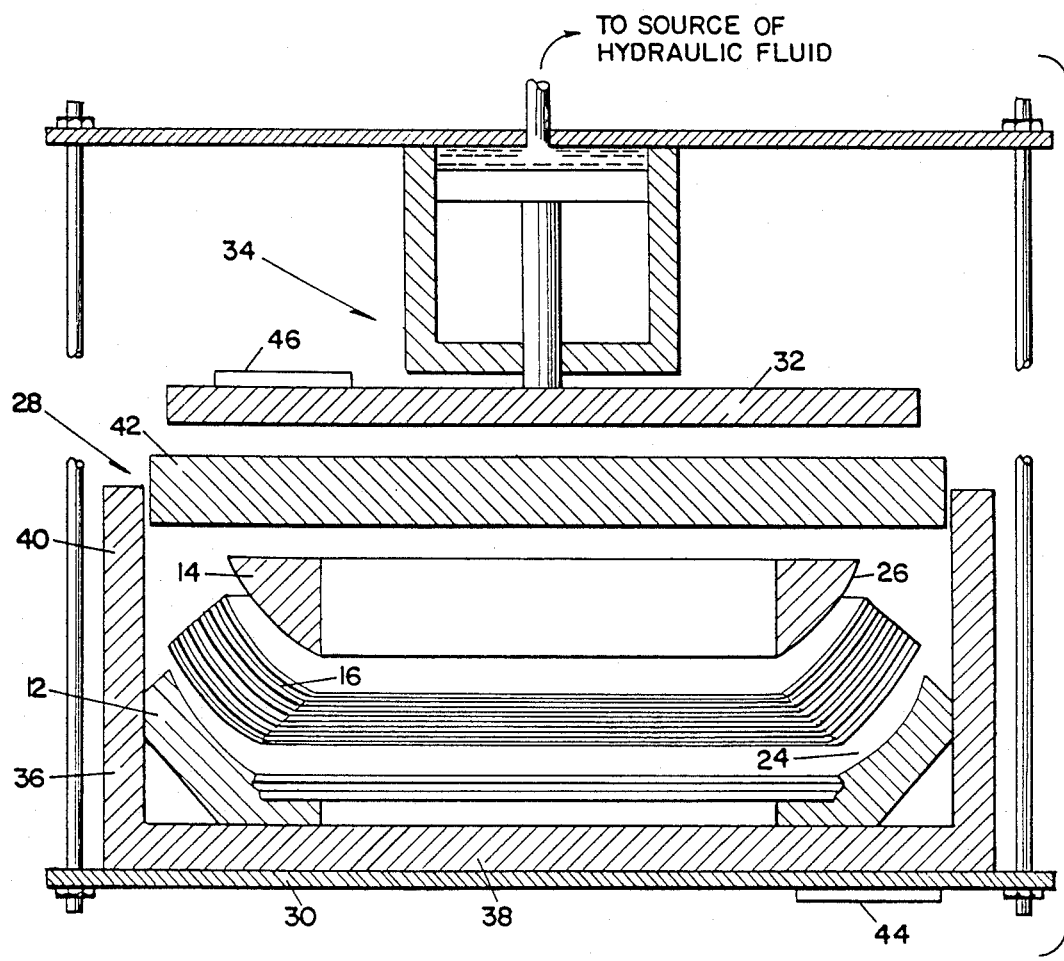
FIG. 5 is an exploded view in partial cross section of the assembly in a mold of stacked end rings, reinforcement layers and alternating layers of elastomer pads in a hydraulic press for compressing and thereby debulking the assembly and for the heating thereof to cause cure and vulcanization of the elastomer and the reinforcement layers of the lamination and the bonding of the latter to the end rings.

4. Assembling and molding of the flexible bearing comprises, as illustrated in FIG. 5, placing the first or forward end ring 12 in the bottom of a mold 28 with the laminate engaging surface 24 facing upwards and then coiling the continuous helical reinforcement layers 18 with alternating layers 20 of elastomer to form the lamination. The second or aft ring 14 is then placed in position with the laminate engaging surface 26 thereof facing downwards. The assembly then is debulked and cured. The flexible bearing assembly is co-cured, that is, the elastomer, pre-impregnated glass cloth and the bonding are all cured at the same time.

As shown in FIG. 5, the mold 28 may be placed between bottom and top plates 30 and 32, respectively, of a hydraulic press 34 which may be of known type, and therefore, will not further be described herein. The mold 28 includes a bottom portion 36 having a base 38 and a cylindrical side wall 40 and a circular top portion 42.

Heat is applied to the laminate 16 simultaneously with the application of pressure thereto by electrically energized Calrod elements 44 and 46 that are operatively associated with the plates 38 and 32, respectively, of the hydraulic press 34. Plates 38 and 32 apply pressure to the end rings 12 and 14 with the laminate 16 therebetween under the force of hydraulic pressure.

Figure 6:
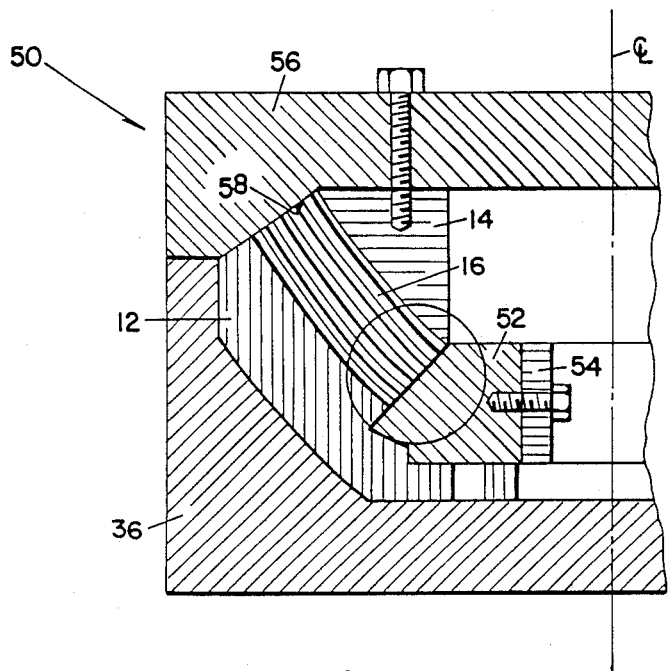
FIG. 6 is a partial cross section illustrating a modification of the mold of FIG. 5 with the laminate in a debulked condition and showing the use of a segmented circular ring for containing the alternate layers of reinforcement and elastomer material.

A modification, designated by reference numeral 50, of the mold 28 of FIG. 5 is illustrated in FIG. 6 wherein a circular ring 52 is provided for containing the alternate layers of reinforcement material 18 and elastomeric material 20 of the laminate 16 at the forward end ring 12 of the flexible bearing 10. The circular ring 52 is segmented to enable removal and is held in place by bolting to an inner ring 54.

In addition, as shown on FIG. 6, the circular top portion, designated 56, of the mold 50 is so configured as to provide a conical inner surface 58 that is operative, when the circular top portion 56 has been pressed into the debulked position of the laminate 16, as shown, to contain the layers of reinforcement and elastomeric material. The segmented circular ring 52 and conical surface 58 thus facilitate the application of pressure to the laminate 16 to effect cure and vulcanization.

Figure 7:
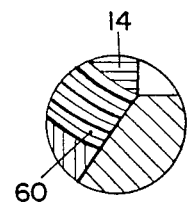
FIG. 7 is an enlarged view of the portion of FIG. 6 that is encircled.

During debulking of the laminate 16 with the apparatus of FIG. 6, excess elastomer 20 is squeezed out and tends to bend and to deform the edges 60 of the reinforcement layers 18, as shown in FIG. 7.

Figure 8:
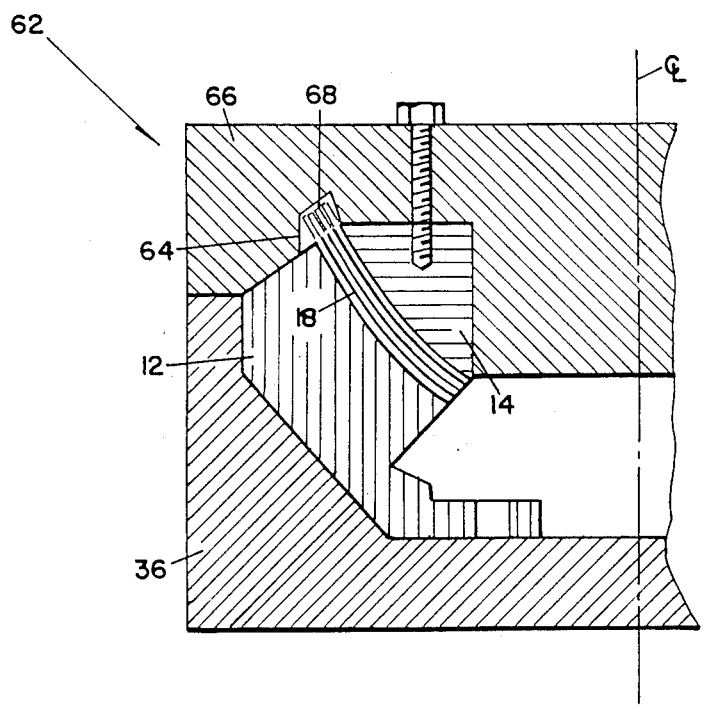
FIG. 8 is a partial cross section illustrating another modification of the mold of FIG. 6 in which the segmented circular ring is omitted.

In a modified form, designated 62, of the mold 50 of FIG. 6, as illustrated in FIG. 8, the segmented circular ring 52 is not used. Excess elastomer 20 is squeezed out from between the inner edges of the reinforcement layers 18 and may be later trimmed off, if desired. The quantity of excess elastomer is generally small, however, and trimming would need to be done only for cosmetic purposes. An annular recess 64 is provided in the circular top portion, designated 66, adjacent the outer edges of the reinforcement layers 18 and elastomer layers 20. The recess 64 allows the reinforcement layers 18 to be wider than the portions of the end rings 12 and 14 to which they are attached. Thus, as shown in FIG. 8, the outer portion 68 of the reinforcement layers 18 extend beyond the end rings 12 and 14.

Figure 9:
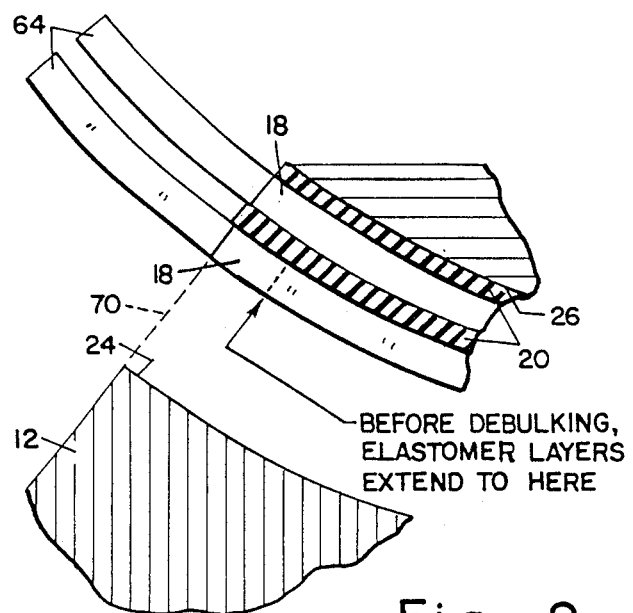
FIG. 9 is a schematic view illustrating an alternative method for fabricating a flexible bearing in which the reinforcement layers may be wider than the end rings to which they are attached.

During preparation of the laminate 16, as illustrated in FIG. 9, adhesive may be applied to the reinforcement layers 18 up to the desired outer line indicated at 70 of the bearing connecting the two end rings 12 and 14. Elastomer 20 desirably is applied over less than the desired final bearing area, that is the area of each of the surfaces 24 and 26 of the end rings 12 and 14, respectively, to the end that, during debulking, expansion of the elastomer 20 extends to the outer line 70. Any further expansion of the elastomer is inconsequential.

The alternative method of fabricating the flexible bearing illustrated in FIGS. 8 and 9 is especially useful when it is desired to have a thermal barrier on the "outside" of the flexible bearing. Thus, referring to FIG. 9, the reinforcement layers 18 are made using glass fibers in the bearing itself between the end ring surfaces 24 and 26, and carbon fibers are used in the outer portion 64 in the thermal barrier. The bearing is thus protected from heat during the burn of the rocket motor on which the bearing is installed.

Figure 10:
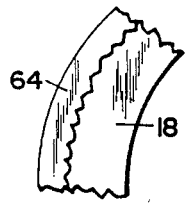
FIG. 10 is a view of a segment of the pre-impregnated reinforcement material of FIG. 10 showing a carbon/phenolic layer and a glass/phenolic layer cross stitched together.

In FIG. 10 there is illustrated the pre-impregnated reinforcement material in which a glass/phenolic layer 18 and a carbon/phenolic outer portion or layer 64 are cross-stitched together by stitching indicated by reference numeral 72.

Figure 11:
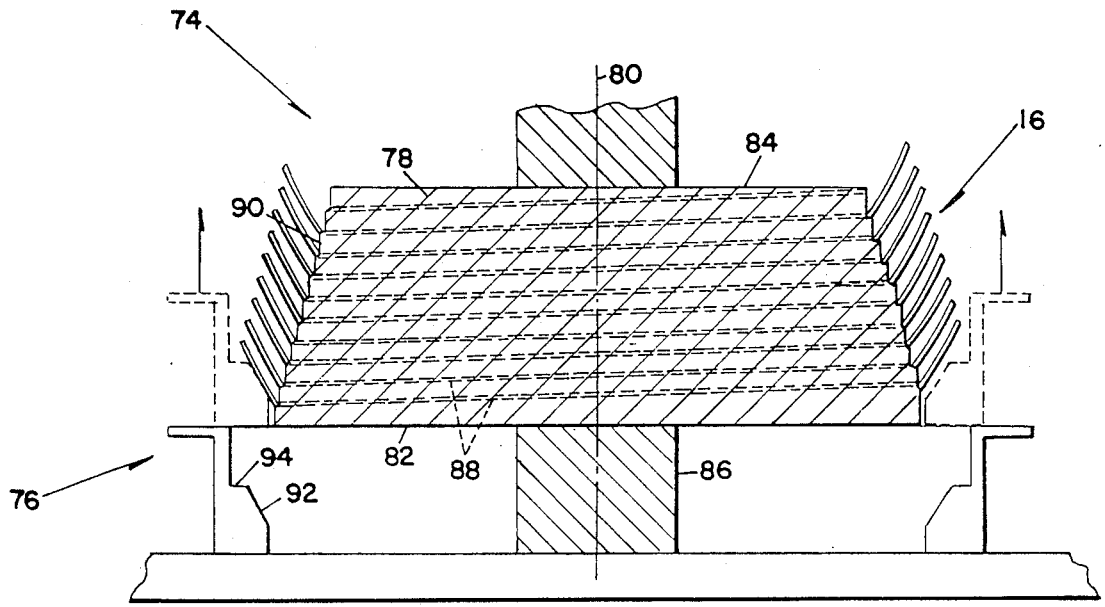
FIG. 11 is a view in longitudinal section of a stacking tool and associated laminate removal tool for aiding in the stacking of the laminate.

FIG. 11 shows in longitudinal section a stacking or mandrel tool 74 and an associated laminate removal tool 76 which advantageously may be employed in forming the helical laminate 16, thereby eliminating the need for hand coiling of the laminate 16 on the forward end ring 12 during assembly of the flexible bearing 10.

The stacking tool 74 includes a conical member 78 having a longitudinal axis 80, a wide end 82 and a narrow end 84. Conical member 78 is supported by a vertically positioned shaft 86 to which it is fixedly attached with the axis of the shaft 86 being substantially coincident with the longitudinal axis 80. Circumscribing the conical member 78 is a continuous helical ridge 88 upon which the pre-impregnated reinforcement material 18 and elastomeric material 20 may be wound. The helical ridge 88, as shown in FIG. 11, desirably slopes inwardly and upwardly of the conical surface 90 of the conical member 78 toward the narrow end 84 thereof, the angle of such slope with respect to the longitudinal axis 80 of the conical member 78 being about 45°.

When winding the continuous helical coil 22 forming the laminate 16 on the stacking tool 74, the latter may be held stationary while the alternate layers of reinforcement material 18 and elastomeric material are hand wound around the helical ridge 88. If desired, suitable provisions may be made, as those skilled in the art will understand, for making the winding operation on the stacking tool 74 automatic, thus eliminating the need for hand winding.

Upon completion of the winding of the preimpregnated laminate 16 upon the conical member 78, the removal tool 76 may then be used to lift the laminate from the conical member 78. To this end, the removal tool 76 is moved upwardly (by means not shown) from the full line position to the dotted line position thereof, as shown in FIG. 11, at which an annular surface 92 on an annular shoulder 94 of the removal tool 76 engages the lower surface of the laminate 16. Continued upward movement of the removal tool 76 lifts the laminate 16 completely off the conical member 78. For maintaining the integrity of the curvature transversely of the reinforcement layers 18, that is across the width thereof, the annular surface 92 of the removal tool 76, in transverse section, desirably is correspondingly curved, as shown.

Thus, the removal tool 76 facilitates the lifting of the pre-impregnated laminate 16 from the stacking tool 74 in the proper configuration for debulking.

Thus, in accordance with the invention, there have been provided herein methods for simplifying the fabrication of flexible bearings and reducing the production cost thereof comprising, in one embodiment, preparing the pre-impregnated reinforcement layers 18 of the laminate 16 in a continuous helical reinforcement form, placing a first end ring in the bottom of a mold, then coiling the continuous helical reinforcement form with alternating layers of elastomer to form the laminate. A second end ring is then placed in position and the assembly is debulked and cured.

In another embodiment, the pre-impregnated reinforcement layers and elastomer layers are wound into a helical coil on a stacking tool. A removal tool associated with the stacking tool facilitates the removal therefrom of the helical coil and the placement thereof on the first end ring in the bottom of the mold. Upon placement of the second end ring in position, the assembly is debulked and cured.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims.

What is claimed is:

1. A stacking tool for preparing a helix of pre-impregnated reinforcement material comprising:
    a shaft having an axis, and
    a conical member having a wide end and a narrow end and having a longitudinal axis extending through said ends, said conical member being fixedly attached to said shaft with the longitudinal axis thereof in substantial alignment with the axis of said shaft,
    said conical member having a continuous helical ridge formed on the conical surface thereof uniformly axially spaced along said surface, said ridge having two sides only, one of which is substantially parallel to said longitudinal axis and the other of which is sloped.

2. A stacking tool as defined by claim 1 wherein the sloped side of the helical ridge on the conical surface of said conical member slopes inwardly of said conical surface toward the narrow end of said conical member.

3. A stacking tool as defined by claim 2 wherein the angle of the slope of the sloped side of the helical ridge is approximately 45°.

4. A stacking tool for preparing a helix of pre-impregnated reinforcement material comprising:
    a shaft having an axis, and
    a conical member having a wide end and a narrow end and having a longitudinal axis extending through said ends, said conical member being fixedly attached to said shaft with the longitudinal axis thereof in substantial alignment with the axis of said shaft,
    said conical member having a continuous helical ridge formed on the conical surface thereof uniformly axially spaced along said surface,
    said stacking tool including in association therewith a removal ring having an inner diameter with an annular shoulder positioned thereat, said removal ring being positioned adjacent the wide end of said conical member, the inner diameter of said removal ring being greater than the diameter of said conical member at the wide end thereof just enough to allow said removal ring to be moved relatively to said conical member,
    whereby, upon such relative movement of said removal ring and said conical member, with a continuous helical coil of impregnated reinforcement material and elastomeric material wound on the continuous helical ridge on said conical member, the annular shoulder of said removal; member engages such continuous helical coil and moves it relatively to said conical member.

5. A stacking tool as defined by claim 4 wherein said conical member is so positioned that the longitudinal axis thereof is vertical with the wide end thereof beneath the narrow end, whereby upon sufficient relative movement of said removal ring and said conical member said removal ring lifts the continuous helical coil from the conical member.

* * * * *